United States Patent
McElhinney et al.

(10) Patent No.: US 6,641,655 B1
(45) Date of Patent: Nov. 4, 2003

(54) FLUIDIZING AGENTS

(75) Inventors: John Joseph McElhinney, Stirlingshire (GB); Kristen Susan Low, Stirlingshire (GB); Laura Janette Murphy, Stirlingshire (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 10/069,420

(22) PCT Filed: Aug. 23, 2000

(86) PCT No.: PCT/GB00/03246

§ 371 (c)(1), (2), (4) Date: Feb. 26, 2002

(87) PCT Pub. No.: WO01/14479

PCT Pub. Date: Mar. 1, 2001

(30) Foreign Application Priority Data

Aug. 26, 1999 (GB) ................................ 9920107

(51) Int. Cl.$^7$ .................. C09B 67/00; C09B 35/10; C09B 35/32; C09D 11/00; C09D 17/00

(52) U.S. Cl. .................. 106/413; 106/31.43; 106/31.75; 106/31.78; 106/31.81; 106/493; 106/496; 106/499; 8/661; 8/662; 564/281

(58) Field of Search .................. 106/410, 413, 106/493, 496, 499, 31.75, 31.43, 31.78, 31.81; 8/661, 662; 564/281

(56) References Cited

U.S. PATENT DOCUMENTS 3,754,958 A   8/1973   Giambalvo ............... 106/411
4,057,436 A  11/1977   Davies et al. ............ 106/410
4,461,647 A  * 7/1984  Schofield et al. ......... 106/494

FOREIGN PATENT DOCUMENTS

GB   1116567   6/1968
GB   1356253   6/1974

* cited by examiner

*Primary Examiner*—Anthony J. Green
(74) *Attorney, Agent, or Firm*—Pillsbury Winthrop LLP

(57) ABSTRACT

A fluidizing agent which is a diamine and/or diquaternary ammonium salt of a coloured acid of the phthalocyanine or disazo series of dyestuffs wherein the diamine or diquaternary ammonium cation is of formula (1) wherein R is optionally substituted $C_{6-30}$-alkyl or optionally substituted $C_{6-30}$-alkenyl; $R^1$ is hydrogen, optionally substituted $C_{1-30}$-alkyl or $C_{2-30}$-alkenyl, optionally substituted cycloalkyl, optionally substituted aryl or optionally substituted aralkyl; $R^2$, $R^3$ and $R^5$ are each, individually, optionally substituted $C_{1-6}$-alkyl, optionally substituted cycloalkyl, optionally substituted aryl or optionally substituted aralkyl; $R^4$ is hydrogen, optionally substituted $C_{1-6}$-alkyl, optionally substituted cycloalkyl, optionally substituted aryl or optionally substituted aralkyl; X is $C_{1-12}$-alkylene or $C_{2-14}$-alkenylene; or $R^1$ and $R^3$ together with the two nitrogen atoms to which they are attached and X form a ring; and/or $R^4$ and $R^5$ together with the nitrogen atom to which they are attached form a ring. Preferably, R is $C_{14-18}$-alkyl, X is propylene and $R^1$ to $R^5$ is methyl.

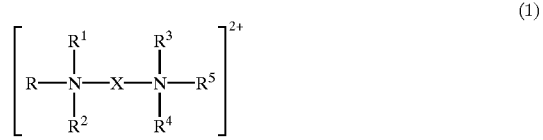

(1)

23 Claims, No Drawings

FLUIDIZING AGENTS

CROSS REFERENCE TO RELATED APPLICATIONS

This application is a national phase application based on PCT/GB00/03246, filed Aug. 23, 2000, and which further claims priority from British Application No. 9920107.1, filed Aug. 26, 1999. These applications in their entirety are incorporated herein by reference.

The present application relates to fluidising agents for reducing the viscosity of dispersions of a particulate solid such as a pigment dispersed in an organic liquid using a dispersant and to millbases, paints and printing inks containing such fluidising agents.

U.S. Pat. No. 4,057,436 discloses a composition comprising a finely divided solid, a polymeric or resinous dispersant, a fluidising agent which is a substituted ammonium salt of a coloured acid wherein there are from 16 to 60 carbon atoms contained in at least 3 chains attached to the N atom of the substituted ammonium cation and an organic liquid. These fluidising agents are stated to give dispersions which exhibit lower viscosity at higher pigment loadings compared with similar dispersions which do not contain the fluidising agent. Examples of suitable amines and substituted ammonium salts which can be used to form the fluidising agents are tertiary amines and quaternary substituted ammonium salts such as N,N-dimethyloctadecylamine, cetyl-trimethyl ammonium bromide, didodecyl dimethyl ammonium chloride, dioctadecyl dimethyl ammonium chloride, N-cetyl pyridinium salts, N-cetyl piperidine, benzyldimethyloctadecyl ammonium chloride, octadecyl bis-(2-hydroxyethyl) amine and 3-(N-octadecyl-N-hydroxyethylamino)propyl-$N^1,N^1$-bis(2-hydroxyethyl)amine. The latter diamine is the only compound containing two tertiary nitrogen atoms which is disclosed. However, there are no specific examples of diamine salts of coloured acids and no advantage is envisaged for such compounds compared with those containing only the one tertiary nitrogen atom. The coloured acid used to make the fluidising agents include mono-, di- and tri-sulphonated copper phthalocyanine and azo and anthraquinone dyestuffs containing sulphonic acid and/or carboxylic acid groups. These fluidising agents were found to be particularly effective in dispersing a copper phthalocyanine pigment in an organic liquid. The copper phthalocyanine may be in crude or pigmentary form.

U.S. Pat. No. 4,461,647 discloses a fluidising agent which is a composition of disazo compounds containing at least 30% by weight of a water-insoluble disazo compound comprising a central divalent group free from acid and other ionic substituents linked through azo groups to two monovalent end groups characterised in that one end group, the first, is free from acidic and other ionic substituents and the other end group, the second, carries a single substituted ammonium-acid salt group. The substituted ammonium-acid salt group can be derived from dioctadecyldimethyl ammonium chloride or hydroxide, hexadecyltrimethyl ammonium bromide, octadec-12-anyldimethylamine and dodecyltrimethyl ammonium chloride.

GB 1356253 discloses benzidine pigment compositions which are mixtures of benzidine pigments which are free from water-solubilising groups and benzidine dyestuffs which contain two or more acid groups. The acid groups may be in the form of amine salts of diamines. These benzidine pigment compositions are stated to give improved colour strength and transparency when incorporated into printing inks compared with benzidine pigments which contain no acid groups. Benzidine pigments are obtained by tetrazotising benzidine derivatives which are free from water-solubilising groups and coupling with 2 moles of acetoacetarylamide or pyrazolone derivatives which are also free from water-solubilising groups. Benzidine dyestuffs containing two or more acid groups have similar structures but contain either two sulphonic acid groups in the benzidine derivative and/or acid groups in each of the coupling components.

It has now been found that fluidising agents which are diamine or diquaternary ammonium salts of coloured acids provide dispersions of pigments in organic liquids which exhibit lower viscosity at high pigment loadings when the diamine or diquaternary ammonium compound contains two or more nitrogen atoms compared with those amines and quaternary ammonium compounds which contain only one nitrogen atom.

According to the invention there is provided a fluidising agent which is a diamine and/or diquaternary ammonium salt of a coloured acid wherein the diamine or diquaternary ammonium cation contains two or more nitrogen atoms, except for fluidising agents which are diamine salts of an N-long chain alkyl alkylene diamine and a benzidine dyestuff containing two or more acid groups.

Preferably, the diamine or diquaternary ammonium cation is of formula 1

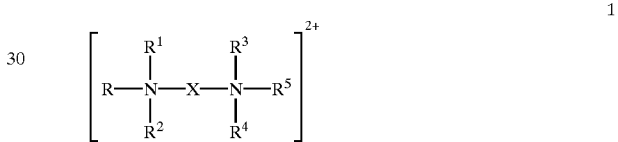

wherein

R is optionally substituted $C_{6-30}$-alkyl or optionally substituted $C_{6-30}$-alkenyl;

$R^1$ is hydrogen, optionally substituted $C_{1-30}$-alkyl or $C_{2-30}$-alkenyl, optionally substituted cycloalkyl, optionally substituted aryl or optionally substituted aralkyl;

$R^2$, $R^3$ and $R^5$ are each, individually, optionally substituted $C^{1-6}$-alkyl, optionally substituted cycloalkyl, optionally substituted aryl or optionally substituted aralkyl;

$R^4$ is hydrogen, optionally substituted $C_{1-6}$-alkyl, optionally substituted cycloalkyl, optionally substituted aryl or optionally substituted aralkyl;

X is $C_{1-12}$-alkylene or $C_{2-14}$-alkenylene; or $R^1$ and $R^3$ together with the two nitrogen atoms to which they are attached and X form a ring; and/or $R^4$ and $R^5$ together with the nitrogen atom to which they are attached form a ring.

In the cation of formula 1, the hydrogen atoms represented by $R^1$ and/or $R^4$ are derived from the coloured acid.

When R and $R^1$ is alkyl or alkenyl it may be linear or branched, but is preferably linear.

When R to $R^5$ are substituted, the substituent may be hydroxy, $C_{1-6}$-alkoxy, cyano or halogen. However, it is preferred that R to $R^5$ are unsubstituted.

When $R^1$ is alkenyl it is preferably $C_{6-30}$-alkenyl.

When $R^1$ to $R^5$ is aryl it is preferably phenyl and when $R^1$ to $R^5$ is aralkyl, it is preferably benzyl or 2-phenylethyl.

When $R^1$ to $R^5$ is substituted aryl or substituted aralkyl, the substituent is preferably hydroxy, $C_{1-4}$-alkoxy, cyano or halogen.

When R to $R^5$ is substituted by halogen it is preferably bromine and especially chlorine.

When $R^1$ to $R^5$ is cycloalkyl it is preferably cyclopentyl or cyclohexyl.

When $R^1$ and $R^3$ together with the two nitrogen atoms to which they are attached and X form a ring, the ring is preferably piperazinyl.

When $R^4$ and $R^5$ together with the nitrogen atom to which they are attached form a ring, the ring is preferably piperidinyl, morpholinyl, piperazinyl or N—$C_{1-6}$-alkylpiperazinyl.

When $R^1$ is optionally substituted $C_{1-30}$-alkyl it is preferably optionally substituted $C_{1-6}$-alkyl.

When $R^1$ to $R^5$ is $C_{1-6}$-alkyl it may be linear or branched. Examples are ethyl, n-propyl, i-propyl, n-butyl, i-butyl, t-butyl, n-hexyl and especially methyl.

It is preferred that the compound of formula 1 contains two nitrogen atoms.

When $R^1$ and $R^4$ are both hydrogen, the compound of formula 1 is a diamine and it forms an amine salt with the coloured acid.

When $R^1$ and $R^4$ are other than hydrogen the compound of formula 1 is a diquaternary ammonium cation and forms a quaternary ammonium salt with the coloured acid.

Preferably X contains not less than 2 and especially not less than 3 carbon atoms. It is also preferred that X contains not greater than 12, more preferably not greater than 8 and especially not greater than 4 carbon atoms. Useful effects have been obtained when X is propylene.

In one preferred group of compounds of formula 1, $R^1$ and $R^4$ are both hydrogen and $R^2$, $R^3$ and $R^5$ are each, independently $C_{1-6}$-alkyl and especially methyl.

In a more preferred group of compounds of formula 1, $R^1$ to $R^5$ are each, independently, $C_{1-6}$-alkyl and especially methyl.

Preferably, R contains not less than 8 carbon atoms. It is also preferred that R contains not greater than 20 and especially not greater than 18 carbon atoms.

The diamines and diquaternary ammonium compounds of formula 1 may be derived from natural products and as such may be available commercially as mixtures of diamines and diquaternary ammonium compounds. Particularly useful mixtures are those derived from tallow. In such mixtures, R is typically $C_{10-18}$-alkyl containing $C_{16}$-alkylene.

The total number of carbon atoms represented by R to $R^5$ and X in the compound of formula 1 is preferably not greater than 80, more preferably not greater than 60, even more preferably not greater than 50 and especially not greater than 30.

Especially useful fluidising agents have been obtained when the compound of formula 1 is N—($C_{14-18}$-alkyl)-N,N,N',N',N'-pentamethyl-1,3-propylene, i.e. R is $C_{14-18}$-alkyl, X is propylene and $R^1$ to $R^5$ is methyl.

The coloured acid may be any pigment or dyestuff which contains at least one acid group. The acid group may be a carboxylic acid, phosphoric acid or preferably a sulphonic acid group which forms a salt with the diamine or diquaternary ammonium cation of formula 1. The coloured acid may be derived from the same chromophore as the pigment or dyestuff to be dispersed. For example, when the pigment or dyestuff belongs to the phthalocyanine class of pigments, the coloured acid is preferably a phthalocyanine pigment containing one or more acid groups or a mixture thereof. Similarly, when the pigment or dyestuff is a disazo compound obtainable by tetrazotising an aromatic diamine and reacting the tetrazonium ion with two moles of a coupling component which does not contain an acid group, the coloured acid is preferably a similar pigment or dyestuff wherein one or both the coupling components are the same as that or those used to prepare the dyestuff or pigment except for the presence of an acid group. In such circumstances it may be beneficial to prepare the fluidising agent in situ and concomitantly with the preparation of the pigment or dyestuff. Such simultaneous preparation of the fluidising agent and pigment or dyestuff results in a more homogenous mixture of the fluidising agent and pigment or dyestuff compared with the separate preparation of the fluidising agent and subsequent mixture with the dyestuff or pigment. When the fluidising agent is derived from a coloured acid having a similar chromophore to the pigment or dyestuff the shade of any resultant paint or printing ink has the advantage that the presence of the fluidising agent does not have a significant effect on colour.

As noted hereinbefore, the coloured acid may be any pigment or dyestuff which contains at least one acid group or a mixture of such pigments or dyestuffs.

In one preferred class of fluidising agents, the coloured acid is a polycyclic aromatic compound of the phthalocyanine series which contains one or more acid groups. The phthalocyanine may be halogenated, for example, chlorinated but is preferably unhalogenated. The phthalocyanine may also be unmetalised but is preferably in the form of its metal complex. Preferred metals are the transition elements in the Periodic Table of Mendeleef as published for example on the inside rear page of Handbook of Chemistry and Physics published by the Chemical Rubber Company, $49^{th}$ edition, Cleveland, Ohio, USA. Preferred metals are titanium, iron, cobalt, nickel and especially copper. The coloured acids of the phthalocyanine pigments are prepared in conventional manner such as by heating in concentrated sulphuric acid or oleum until the required degree of sulphonation is achieved. Preferably, the phthalocyanine coloured acid contains on average from 0.7 to 2.0, more preferably 1 to 1.5 and especially from 1.15 to 1.25 sulphonic acid groups/mole.

In another preferred class of fluidising agents, the coloured acid is a disazo dyestuff comprising a central divalent group which is free from acid and other ionic substituents which is linked through azo groups to coupling components, the first of which is free from acid and other ionic substituents and the second carries one or more acid groups and is free from other ionic substituents.

Preferably, the second coupling component carries only the one acid group.

The central divalent group is preferably a biphenylene group which may be unsubstituted or substituted by one or more non-ionic groups. Examples of such groups are $C_{1-6}$-alkyl, $C_{1-6}$-alkoxy, halogen, nitro and cyano. When the substituent is alkyl, it is preferably methyl and when the substituent is alkoxy, it is preferably methoxy. When the substituent is halogen, it is preferably bromine and especially chlorine.

Specific examples of the central divalent group are biphenylene, 2,2'-dichlorobiphenylene, 3,3'-dimethoxybiphenylene, 2,2'-dichloro-5,5'-dimethoxybiphenylene, 3,3'-dimethoxybiphenylene and 3,3'-dimethylbiphenylene. In addition to the above substituents, the biphenylene central divalent group may also carry an acetoacet-2-ylamino group in the 4,4' positions such as 4,4'-di(acetoacet-2-ylamino)-biphenyl and 4,4'-di(acetoacet-2-ylamino)-3,3'-dimethylbiphenyl as found in CI Pigment Yellow 16 and Pigment Yellow 77.

The first coupling component is preferably a pyrazolin-5-on-4-yl group, a 2-hydroxynaphth-1-yl group or an acetoacet-2-ylanilide group. The first coupling component may carry other substituents which is not an acid or other ionic group such as $C_{1-6}$-alkyl, $C_{1-6}$-alkoxy, halogen, nitro, cyano, $C_{1-6}$-alkoxycarbonyl, phenylaminocarbonyl, naphthylaminocarbonyl and phenyl in which the phenyl and naphthyl groups may also be substituted by $C_{1-6}$-alkyl, $C_{1-6}$-alkoxy, nitro, halogen or cyano.

Specific examples of the first coupling component are residues of formula 2 to 4 below. In formulae 2 to 4, the coupling position is indicated by an unattached bond.

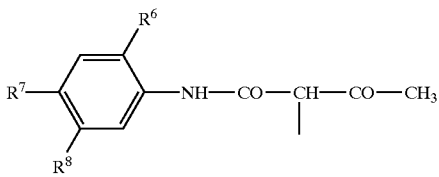
(2)

wherein $R^6$, $R^7$ and $R^8$ are selected from H, $C_{1-6}$-alkyl, $C_{1-6}$-alkoxy, nitro and halogen, specific examples being shown in the following table.

| $R^6$ | $R^7$ | $R^8$ |
|---|---|---|
| H | H | H |
| —CH$_3$ | —CH$_3$ | H |
| —CH$_3$ | H | H |
| —OCH$_3$ | H | H |
| H | —CH$_3$ | H |
| —OCH$_3$ | Cl | —OCH$_3$ |
| Cl | H | H |
| —OCH$_3$ | H | —OCH$_3$ |
| H | —OC$_2$H$_5$ | H |

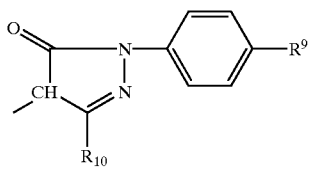
(3)

wherein $R^9$ and $R^{10}$ are selected from H, $C_{1-6}$-alkyl, $C_{1-6}$-alkoxy, halogen, nitro and $C_{1-6}$-alkoxy-carbonyl, specific examples being shown in the following table.

| $R^9$ | $R^{10}$ |
|---|---|
| H | —CH$_3$ |
| —CH$_3$ | —CH$_3$ |
| H | —CO$_2$C$_2$H$_5$ |
| —NO$_2$ | —CH$_3$ | and (4)

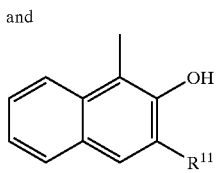

wherein $R^{11}$ is H or a group of the formula:

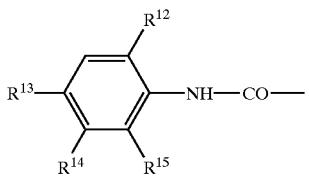

wherein $R^{12}$ to $R^{15}$ are selected from H $C_{1-6}$-alkyl, $C_{1-6}$-alkoxy, halogen and nitro, specific examples being shown in the following table.

| $R^{12}$ | $R^{13}$ | $R^{14}$ | $R^{15}$ |
|---|---|---|---|
| H | H | —CH$_3$ | —CH$_3$ |
| H | H | NO$_2$ | H |
| H | Cl | H | H |
| H | —CH$_3$ | H | H |
| H | H | H | —CH$_3$ |
| H | H | H | —OCH$_3$ |
| H | H | H | —OC$_2$H$_5$ |
| H | Cl | H | —CH$_3$ |
| Cl | H | —CH$_3$ | H |
| —OCH$_3$ | H | —OCH$_3$ | H |
| —OCH$_3$ | —OCH$_3$ | Cl | H | or $R^8$ is of the formula:

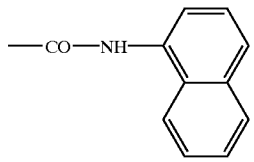

The second coupling component of the disazo dyestuff which contains one or more acid groups may be otherwise identical to the first coupling component. Preferably, the second coupling component contains only the one acid group. The preferred second coupling components are, however, acetoacetanilides containing an acid group in the 4 position of the phenyl ring, 1-phenylpyrazolin-5-ones containing an acid group in the 4 position of the phenyl ring and a 2-naphthyl group where the acid group is in the 6-position.

In a further less preferred class of fluidising agent, the coloured acid is a disazo compound comprising a central divalent group which contains one or more acid groups and is free from other ionic substituents which is linked through azo groups to two coupling components which may optionally contain one or more acid groups and where the acid groups are in the form of a salt of a diquaternary ammonium cation of formula 1. The central divalent group may additionally carry substituents as disclosed hereinbefore and the coupling components, which may be the same or different are also as described hereinbefore. Preferably, the coupling components are both the same. It is also preferred that the acid group or groups in the central divalent group is a sulphonic acid group. Examples of such preferred central divalent groups are biphenylene-2,2'-disulphonic acid and 5,5'-dimethylbiphenylene-2,2'-disulphonic acid. Examples of other central divalent groups are biphenylene-2,2'-dicarboxylic acid and 5,5'-dimethylbiphenylene-2,2'-dicarboxylic acid.

The fluidising agents may be made by any means known to the art such as reacting the coloured free acid either wholly or in part with the diamine and/or salt of a diquaternary ammonium compound or by reacting an alkali metal salt of the coloured acid with the halide or hydroxide salt of the diamine and/or diquaternary ammonium compound. The formation of the coloured acid salts is typically carried out in water or a polar solvent, including mixtures thereof and the fluidising agent isolated by conventional means such as filtration.

The amount of diamine and/or diquaternary ammonium compound to coloured acid may vary over wide limits. However, there is generally no advantage in having an excess of diamine and/or diquaternary ammonium compound over the number of acid groups in the coloured acid. With some fluidising agents, such as those derived from a disazo coloured acid containing only one acid group, it may be advantageous for all the acid groups in the fluidising agent to be in the form of the diamine and/or diquaternary ammonium salts. With other fluidising agents it may be preferable to use less diamine and/or diquaternary ammonium compound relative to the number of acid groups. Where the fluidising agent contains acid groups other than those in the form of a salt with the diamine and/or diquaternary ammonium compound, those acid groups may be in the form of the free acid or salt of an alkali or alkali earth metal. Where the coloured acid is a polycyclic compound of the phthalocyanine class of pigments, useful fluidising agents have been obtained where not greater than 80%, and especially not greater than 60% of the acid groups have been converted to the salt form of the diamine and/or diquaternary ammonium compound. Preferably the amount of diamine and/or diquaternary ammonium compound to acid groups in the phthalocyanine coloured acid is not less than 20% and especially not less than 30%.

Where the coloured acid is an azo or disazo dyestuff it may be prepared by any means known to the art and especially those processes described in GB 1,356,253 and U.S. Pat. No. 4,461,647. Thus, for example, an aromatic amine may be diazotised or an aromatic diamine may be tetrazotised and reacted with a coupling component or components under neutral or alkaline conditions in aqueous media to form a coloured acid containing one or more acid groups. The acid groups may be converted, at least in part, to the salt of the diamine and/or diquaternary ammonium compound as disclosed hereinbefore. The azo or disazo coloured acid may contain a mixture of acid groups in the form of a salt of the diamine and/or diquaternary ammonium compound and also an acid group in the form of its free acid or salt with an alkali metal or alkaline earth metal. Preferably, the acid groups are substantially in the form of the salt with the diamine and/or diquaternary ammonium compound, especially where the coloured acid is a disazo dyestuff.

In certain instances, it may be advantageous to prepare the fluidising agent concomitantly with the pigment. This is particularly preferred where the coloured acid is a disazo dyestuff, especially that containing a biphenylene central divalent group, and the pigment has a similar structure which is free from acid or other ionic groups.

Thus, according to a further aspect of the invention there is provided a composition comprising a fluidising agent and a pigment.

Preferably, the pigment has a similar chemical structure to the coloured acid of the fluidising agent but is free from acid or other ionic groups.

In one preferred aspect, there is provided a composition comprising a phthalocyanine pigment and a fluidising agent which is a phthalocyanine dyestuff containing one or more acid groups in the form of a salt with a diamine and/or diquaternary ammonium cation of formula 1. Preferably, the phthalocyanine pigment and phthalocyanine dyestuff are metal phthalocyanines containing nickel or preferably copper.

In another preferred aspect there is provided a composition comprising an azo or disazo pigment and a fluidising agent which is an azo or disazo coloured acid containing one or more acid groups in the form of a salt with a diamine and/or diquaternary ammonium cation of formula 1. It is preferred that the pigment and coloured acid are either both azo compounds or both disazo compounds.

When the pigment and coloured acid are both disazo compounds and the fluidising agent is prepared concomitantly with the pigment, the coloured acid and hence fluidising agent may be a mixture as discussed hereinafter.

According to another aspect of the invention, there is provided a disazo composition comprising at least 30%, by weight, of an asymmetric fluidising agent which is a water insoluble disazo coloured acid wherein a central divalent group which is free from acid and other ionic groups is linked through azo groups to coupling components, the first of which is free from acid or other ionic groups and the second carries one or more acid groups in the form of a diquaternary ammonium cation of formula 1.

A preferred composition according to the invention contains an asymmetric compound of formula

Y—B—A—B—Z wherein

A is selected from biphenylene, 3,3'-dichlorobiphenylene, 3,3'-dimethylbiphenylene, 3,3'-dimethoxybiphenylene and 2,2'-dichloro-5,5'-dimethoxybiphenylene;

both B components are either azoacetoacetamide groups of formula

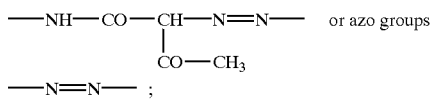

Y is selected from pyrazolin-5-on-4-yl, 2-hydroxynaphth-1-yl and 2-hydroxy-3-carbonylaminophenylnaphth-1-yl which may be substituted by one or more groups selected from $C_{1-6}$-alkyl, $C_{1-6}$-alkoxy, halogen, nitro and $C_{1-6}$-alkoxycarbonyl and when B is azoacetoacetamido Y is phenyl or phenyl substituted by one or more groups selected from $C_{1-6}$-alkyl, $C_{1-6}$-alkoxy, halogen and nitro; and Z is selected from the same groups as Y except that it carries an acid group in the form of a salt of a diquaternary ammonium cation of formula 1 in addition to or in place of one of the substituents already on Y.

As disclosed hereinbefore, it may be advantageous to prepare the fluidising agent and pigment simultaneously, especially where the pigment and coloured acid are both disazos and especially disazos of the benzidine class of colourants. In this case, the composition is a mixture of disazo compounds of formulae

Y—B—A—B—Z

Y—B—A—B—Y

Z—B—A—B—Z

Preferably, the composition comprises at least 35% and especially at least 40%, by weight, of the asymmetric fluidising agent. It is also preferred that the composition comprises not greater than 70%, more preferably not greater than 65% and especially not greater than 60%, by weight, of the asymmetric compound. It is especially preferred that the composition contains from 50 to 60%; by weight, of the asymmetric compound.

In some instances it may be beneficial to provide the fluidising agent in an organic liquid. Hence, according to a further aspect of the invention there is provided a composition comprising an organic liquid and the fluidising agent.

As noted hereinbefore, the fluidising agents according to the invention are particularly useful in providing a dispersion of a pigment in an organic liquid which exhibits enhanced fluidity, especially at high pigment loading. Thus, according to a further aspect of the invention there is provided a dispersion comprising a pigment, dispersant, fluidising agent and organic liquid.

The pigment may be from any of the recognised classes of pigments described, for example, in the Third Edition of the Colour Index (1971) and subsequent revisions of, and supplements thereto, under the chapter headed "Pigments". The pigment may be inorganic or organic. Examples of inorganic pigments are titanium dioxide, zinc oxide, Prussian blue, cadmium sulphide, iron oxides, vermillion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nubclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthanthrones, quinacridones and carbon blacks.

The dispersant is preferably a resinous or polymeric material which is mixed with the pigment to uniformly distribute the pigment throughout the organic liquid. Preferred dispersants are obtainable by reacting polyester chains with amines, polyamines or polyimines to form amide and/or salt linkages or dispersants containing polyester chains reacted with polyisocyanates containing from 2 to 10 isocyanate groups. The polyester chain may be derived from a single hydroxycarboxylic acid containing an alkylene or alkenylene chain or a mixture of hydroxycarboxylic acids, including lactones thereof. Preferred hydroxycarboxylic acids contain from 6 to 20 carbon atoms between the hydroxy group and the carboxylic acid group. Examples of suitable hydroxycarboxylic acids are ricinoleic, 12-hydroxystearic, 12-hydroxydodecanoic, 5-hydroxydodeconoic, 5-hydroxydecanoic and 4-hydroxydecanoic acids. Suitable lactones are ε-caprolactone optionally substituted by $C_{1-6}$-alkyl groups and δ-valerolactone. The polyester chain may also carry a polymerisation terminating group which is derived from a carboxylic acid which is free from hydroxy groups. Examples of such acids are stearic and lauric acids.

The amine, polyamine or polyimine from which the dispersant is derivable has a preferred number average molecular weight between 100 and 500,000. The amine may be relatively small, such as dimethylaminopropylamine or it may be relatively large such as polyvinylamine, polyallylamine or $C_{2-6}$-polyalkyleneimine, for example polyethyleneimine. Any free amine groups in the dispersant may optionally be converted to quaternary ammonium groups by reaction with alkyl halides or dialkylsulphates such as methyl bromide or dimethylsulphate.

Preferred dispersants are those derivable from polyhydroxystearic acid as disclosed, for example, in U.S. Pat. No. 3,996,059.

The organic liquid may be either polar or preferably substantially non-polar.

By the term "polar" in relation to the organic liquid is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic liquids generally have a hydrogen bonding number of 5 or more as defined in the above mentioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39–40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexaonone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar organic liquid which may be used alone or in admixture with the polar organic liquid may be aliphatic or aromatic and may be substituted by halogens such as chlorine. Examples of aliphatic hydrocarbons are heptane, octane, nonane and the high boiling aliphatic distillates such as white spirits. Examples of aromatic organic liquid are toluene and xylene. Examples of halogenated organic liquids are monochlorobenzene, dichlorobenzene, trichlorobenzene, trichloroethane and parchloroethylene.

Preferably, the organic liquid is a non-polar organic liquid and is especially toluene, xylene or a high boiling aliphatic distillate such as white spirits.

Examples of suitable polar resins, as the organic liquid for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde.

The dispersion may be made by any means known to the art. Thus, the particle size of the pigment may be reduced by attrition processes such as grinding or milling preferably in the presence of the dispersant and organic liquid. The fluidising agent may be added at any stage, including addition to the final dispersion. However, it is preferred to add the fluidising agent prior to the attrition process. Preferably, the particle size of the pigment is reduced to less than $10\mu$, more preferably less than $3\mu$ and especially less than $1\mu$. The attrition process is normally carried out at 20 to 25° C. However, with certain pigments it may be beneficial to carry out the attrition process at 50 to 150° C. in a non-polar organic liquid which is, or contains, a high boiling aliphatic distillate. This is particularly true where the pigment and coloured acid of the fluidising agent belong to the phthalocyanine class and where such high temperature attrition process can result in greener and brighter shades in the final printing ink or paint.

The dispersion preferably contains from 5% to 70%, by weight, pigment based on the total amount of the dispersion and from 1% to 50%, by weight, of fluidising agent and from 3% to 50%, by weight of dispersant, both latter amounts being based on the amount of pigment. It is especially preferred that the amount of pigment is from 25% to 60% of the dispersion and the amount of fluidising agent is from 5% to 15% and the amount of dispersant is from 10% to 30%, both on amount of pigment, respectively.

The fluidising agent may be used in the preparation of millbases where the dispersion additionally comprises a film-forming resin and the attrition process is preferably carried out with the film-forming resin present. Typically, the millbase contains from 20 to 70%, by weight, pigment based on the amount of millbase. Preferably, the amount of pigment is not less than 30% and especially not less than 50%. The amount of film-forming resin may vary over wide limits but is preferably not less than 10% and especially not less than 20% of the continuous/liquid phase of the millbase. Preferably, the amount of resin is not greater than 50% and especially not greater than 40%, by weight, of the continuous/liquid phase of the millbase. The amount of dispersant and fluidising agent in the millbase relative to the amount of pigment is as disclosed for the dispersion.

The dispersion and millbase can contain other adducts which are commonly added to paints and printing inks such as humectants, fillers, cross-linkers and preservatives.

The dispersions and millbases containing the fluidising agent are particularly useful for preparing printing inks and paints, especially high solid containings paints and inks, especially flexographic, gravure and screen inks.

The dispersions and millbases may also be used to prepare tinter inks and paints which comprise a base pigment and a tinter pigment. The base pigment is preferably ferric oxide and especially titanium dioxide dispersed in a non-polar organic liquid and the coloured tinter pigment is added which is dispersed in a polar organic liquid such as ethylene glycol and/or water. Preferably, the amount of tinter pigment is not greater than 10% and especially not greater than 3%, by weight, based on the amount of base pigment. It is also preferred that the amount of polar liquid and/or water is not greater than 30% and especially not greater than 10%, by weight, based on the non-polar liquid.

The invention is further illustrated by the following examples wherein all references are to parts by weight unless expressed to the contrary.

Examples 1 and 2

Blue Fluidising Agents

Copper phthalocyanine (CuPc 31.62 parts) was added slowly to 20% oleum (139.75 parts) with stirring at 38° C. The temperature was raised to 50° C. and stirring continued to thoroughly disperse the CuPc. The temperature was then raised to 65° C. and stirring continued to effect sulphonation. When the requisite sulphonation had been obtained, the reaction mix was drowned out into cold water (550 parts). The product was filtered and washed with progressively decreasing strength of hydrochloric acid (1% to 0.1%) to give a paste of sulphonated CuPc in 0.1% acid. Water (200 parts) was added to the paste which was then stirred at 70° C. prior to adding tallowpentamethylpropylenediammonium hydrochloride as a 50% solution in isopropanol (Duoquad T50 ex. Akzo). The reaction mix was stirred for a further 1 hour at 70° C., filtered hot, washed with water and dried.

A dispersion was prepared containing CuPc pigment (14.4 parts, Lutetia Blue ENJ ex. BASF), amine dispersant (1.8 parts, Solsperse 17000 ex. Avecia), fluidising agent (0.4 parts), toluene (23.4 parts) and glass beads (3mm diameter, 150 parts). The dispersion was shaken on a Red Devil Shaker for 30 minutes and then separated from the beads. The viscosity was measured using a Bohlin Viscometer and also assessed visually using an arbitrary scale of A to E (very fluid to extremely viscous). The results are given in Table 1 below.

TABLE 1

| Example | Fluidising Agent | Degree of Sulphonation | % Salt | Arbitrary Viscosity |
|---|---|---|---|---|
| 1 | 1 | 1.2 | 60 | B |
| 2 | 2 | 1.7 | 40 | B |
| A | A | 1.2 | 40 | E |
| B | B | 1.7 | 40 | D |
| C | C | 1.2 | 60 | E |
| D | D | 1.7 | 60 | D |
| E | E | 2.0 | 50 | C |
| F | F | 1.3 | 50 | C |

Footnote to Table 1
Fluidising agents A, B and C were prepared using Arquad 2C-75 (N,N-didodecyl-N,N-dimethyl ammonium chloride).
Fluidising Agents A is Agent A of U.S. Pat. No. 4,057,436 and Fluidising Agents B and C were made by analogous methods.
Fluidising agent D was prepared using N-octadecyl-N,N,N-trimethyl ammonium chloride.
Fluidising Agents E and F were prepared using N,N-dioctadecyl-N,N-dimethyl ammonium chloride.
Fluidising Agent E is Agent C of U.S. Pat. No. 4,057,436 and Fluidising Agent F is Agent B of U.S. Pat. No. 4,057,436.

Examples 3 to 11

Examples 1 and 2 were repeated except the degree of sulphonation and % salt conversion of the sulphonic acid groups of the copper phthalocyanine is as indicated in Table 2 below.

In Table 2, different quaternary ammonium cations were examined of general formula

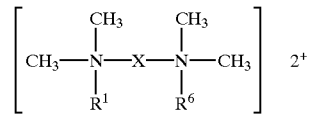

TABLE TWO

| Example | Fluidising Agent | R¹ | R⁶ | X | % Salt | DOS | Arbitrary Viscosity |
|---|---|---|---|---|---|---|---|
| 3 | 3 | $C_{12}$ | $C_{12}$ | —$CH_2CH$=$CHCH_2$— | 60 | 0.6 | C |
| 4 | 4 | $C_{18}$ | $C_{18}$ | —$(CH_2)_4$— | 40 | 0.6 | B |
| 5 | 5 | $C_{18}$ | $C_{18}$ | —$CH_2CH$=$CHCH_2$— | 60 | 1.7 | C |
| 6 | 6 | $C_{12}$ | $C_{12}$ | —$(CH_2)_4$— | 40 | 1.7 | C |
| 7 | 7 | $C_{18}$ | $C_{18}$ | —$(CH_2)_6$— | 60 | 1.2 | B |
| 8 | 8 | $C_{12}$ | $C_{12}$ | —$(CH_2)_6$— | 60 | 1.2 | B |
| 9 | 9 | $C_{18}$ | $C_1$ | —$(CH_2)_3$— | 90 | 1.2 | B |
| 10 | 10 | $C_{18}$ | $C_1$ | —$(CH_2)_3$— | 60 | 0.8 | B |
| 11 | 11 | $C_{18}$ | $C_1$ | —$(CH_2)_3$— | 40 | 1.7 | A |
| C | | — | — | — | 60 | 1.2 | E |
| F | | — | — | — | 50 | 1.3 | C |

Footnote to Table 2
Data in columns R¹ and R⁶ indicate the number of carbon atoms in the saturated aliphatic chain.

DOS is the degree of sulphonation.

Examples C and F utilise Comparative Agents C and F, respectively, which are explained in the footnote to Table 1.

Example 12
Pyrazolone Disazo Yellow Fluidising Agent
a) Preparation of Dyestuff

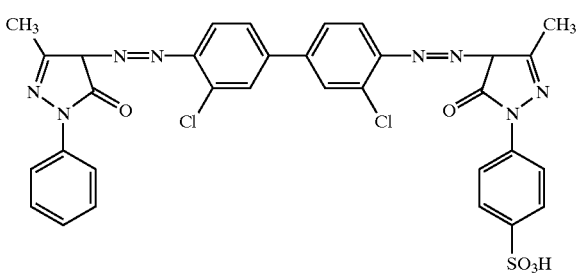

3,3¹-Dichlorobenzidine dihydrochloride (10 parts, 0.0306 M ex sigma) was stirred in water (100 parts). Concentrated hydrochloric acid (10 ml) was added and the volume adjusted to 300 ml by addition of water. The diamine was tetrazotised by dropwise addition of sodium nitrite (6 parts) dissolved in water (20 ml) and stirring for 1 hour at 0° C.

Excess nitrous acid was destroyed by addition of sulphamic acid. 3-methyl-1-phenyl-2-pyrazolin-5-one (6.41 parts, 0.0368M ex Acros) and 3-methyl-1-(4-sulphophenyl)-2-pyrazolin-5-one (9.36 parts, 0.0368M ex Acros) were added to water (50 ml) and the pH adjusted to 9–9.5 by addition of caustic soda solution to dissolve the pyrazolones. This was then diluted to 400 ml by addition of water and the tetrazotised diamine added with stirring at <5° C. and maintaining a pH of 8.5 by addition of alkali. After stirring for 1 hour the temperature was raised to 90° C. and the reaction mix was stirred for a further 1 hour at 90° C. After cooling, the pH was adjusted to 3 and the yellow dyestuff was filtered, washed with hot water and dried at 90° C. to give an orange solid (23 parts).

b) Preparation of Decamethonium Salt

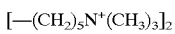

The disazo dyestuff (2 parts, 0.003M) was dissolved in water (60 ml) and isopropanol (20 mls) by stirring at 75° C. Decamethonium bromide (0.87 parts ex Aldrich) was added with stirring at 75° C. After cooling, the product was filtered, washed with water and dried at 75° C. to give an orange solid (2.6 parts). This is Fluidising Agent 12.

Comparative Example G

Example 12b) was repeated except replacing the decamethonium bromide with N,N-didodecyl-N,N-dimethyl ammonium chloride (1.16 parts, Arquad 2C ex Akzo) to give an orange solid (2.5 parts). This is Fluidising Agent G.

Example 13
Acetoacetarylamide Disazo Yellow Fluidising Agent
a) Preparation of Dyestuff

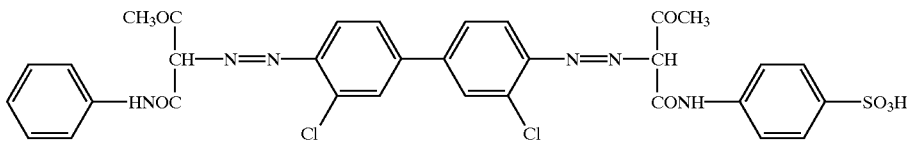

3,3¹-Dichlorobenzidine dihydrochloride (5.33 parts, 0.0163 M ex Sigma) was stirred with water (50 ml) and then concentrated hydrochloric acid (5 ml) and water (100 ml) was added. After stirring at 20° C. for 16 hours, the diamine solution was cooled to 0° C. and tetrazotised by the dropwise addition of sodium nitrite (3 parts) dissolved in water (10 ml). After stirring at 0° C. for a further 1 hour excess nitrite as removed by addition of sulphamic acid.

A coupling bath was prepared by dissolving acetoacetanilide (3.91 parts, 0.0221M ex Acros) and potassium N-acetoacetylsulphanilate (6.51 parts, 0.0220M ex Lonza) in water (100 parts) and caustic liquor (4.5 ml) at 40° C. After cooling to 20° C, concentrated hydrochloric acid (2.5 ml) and acetic acid (2 ml) was added to the coupling bath and followed by addition of the tetrazo solution with stirring below 5° C. and maintaining a pH of 4.5 by addition of sodium acetate. Finally, the pH was adjusted to 3 and the dyestuff filtered, washed with hot water and dried at 90° C. to give an orange solid (15 parts).

b) Preparation of Duoquad Salt

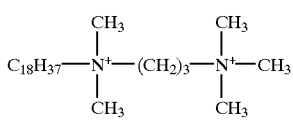

Disazo orange solid (2 parts) was stirred in water (60 ml) and isopropanol (20 ml) at 75° C. The diquaternary ammonium chloride (1.66 parts as a 50% solution in isopropanol, Duoquad T50, ex Akzo.) was added and stirred for 1 hour at 75° C. After cooling, the dye salt was filtered, washed with water and dried at 75° C. to give an orange/yellow solid (2.6 parts). This is Fluidising agent 13.

c. Preparation of Decamethonium Salt

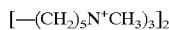

Example 13b) was repeated except using decamethonium bromide (0.86 parts) in place of the Duoquad T50. This is Fluidising Agent 14.

Comparative Example H

Example 13b) was again repeated except using N,N-didodecyl-N,N-dimethyl ammonium chloride (1.15 parts as a 75° C. solution isopropanol, Arquad 2C ex Akzo) This is Fluidising Agent H.

Example 14
Naphthol Disazo Red Fluidising Agent
a) Preparation of Dyestuff

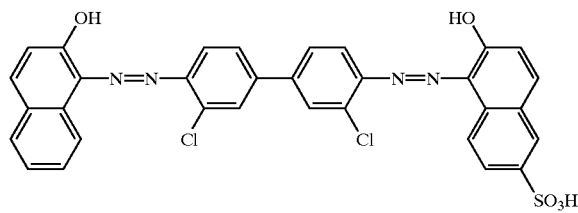

Example 12a) was repeated except using a coupling mixture of 2-naphthol (5.35 parts, 0.0371 m ex Aldrich) and sodium-2-hydroxy-6-naphthalene sulphonate (9.14 parts, 0.0407 m ex Avecia ). The dyestuff was obtained as a purple solid (20 parts).

b) Preparation of Duoquad salt

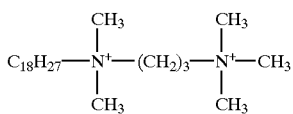

Disazo dyestuff (2 parts) was stirred in water (60 ml) and isopropanol (20 parts) at 75° C. The diquaternary ammonium chloride (1.84 parts as 50% solution in isopropanol, Duoquad T50 ex Akzo) was added and the reactants were stirred at 75° C. for 1 hour. After cooling, the product was filtered, washed with hot water and dried at 75° C. to give a purple solid (2.7 parts). This is Fluidising Agent 15.

Comparative Example

Example 14b) was repeated except using N,N-didodecyl-N,N-dimethyl ammonium chloride (1.28 parts as a 75% solution in isopropanol, Arquad 2C ex Akzo). Fluidising Agent I was obtained as a purple solid (2.8 parts).

Examples 15 and 16

A dispersion was prepared by milling yellow pigment (2 parts, Irgalite Yellow BW ex Ciba Geigy), amine dispersant (0.4 parts, Solsperse 17000 ex Avecia), fluidising agent (0.1 part) and aliphatic solvent (Paraset 29L ex Carless Refining Ltd) in the presence of 3 mm diameter glass beads (17 parts) on a horizontal shaker for 30 minutes. The viscosity of the resultant dispersion was assessed by hand shaking using an arbitrary scale of A to E (low viscosity to high viscosity). The results are given in Table 2 below and show that the fluidising agent prepared with a diquaternary ammonium cation exhibit superior viscosity to those prepared using a monoquaternary ammonium cation.

TABLE 2

| Example | Fluidising Agent | Viscosity |
|---------|------------------|-----------|
| 15      | 15               | C/D       |
|         | I                | D         |
| 16      | 12               | C/D       |
|         | G                | D         |

Examples 17 and 18

Examples 15 and 16 were repeated except using amine dispersant (0.45 parts, Solsperse 17000), fluidising agent (0.25 parts) and toluene (7.3 parts). The results are given in Table 3 below and again show the superior viscosity of dispersions prepared using a fluidising agent which is a diquaternary ammonium salt.

TABLE 3

| Example | Fluidising Agent | Viscosity |
|---------|------------------|-----------|
| 17      | 13               | C         |
| 18      | 14               | C         |
|         | J                | C/D       |

Fluidising Agent J is Example 1 of GB 2,108,143 (monoquaternary ammonium salt)

What is claimed is:

1. A fluidising agent which is a diquaternary ammonium salt of a coloured acid wherein the diquaternary ammonium cation contains two or more nitrogen atoms.

2. A fluidising agent as claimed in claim 1 wherein the diquaternary ammonium cation is of formula 1

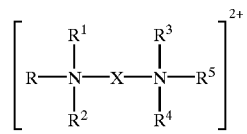

wherein
R is optionally substituted $C_{6-30}$-alkyl or optionally substituted $C_{6-30}$ alkenyl;
$R^1$ is optionally substituted $C_{1-30}$-alkyl or $C_{2-30}$-alkenyl, optionally substituted cycloalkyl, optionally substituted aryl or optionally substituted aralkyl;
$R^2$, $R^3$, and $R^5$ are each, individually, optionally substituted $C_{1-6}$-alkyl, optionally substituted cycloalkyl, optionally substituted aryl or optionally substituted aralkyl;
$R^4$ is optionally substituted $C_{1-6}$-alkyl, optionally substituted cycloalkyl, optionally substituted aryl or optionally substituted aralkyl;

X is $C_{1-12}$-alkylene; or $R^1$ and $R^3$ together with the two nitrogen atoms to which they are attached and X form a ring; and/or $R^4$ and $R^5$ together with the nitrogen atom to which they are attached form a ring.

3. A fluidising agent as claimed in claim 2 wherein R is $C_{6-30}$-alkyl and/or $C_{6-20}$-alkenyl and $R^1$ to $R^5$ are each, independently, $C_{1-6}$-alkyl.

4. A fluidising agent as claimed in claim 2 wherein the total number of carbon atoms represented by R to $R^5$ and X is not greater than 80.

5. A fluidising agent as claimed in claim 2 wherein X is alkylene containing not less than 2 and not greater than 12 carbon atoms.

6. A fluidising agent as claimed in claim 1 wherein the coloured acid is a phthalocyanine which contains one or more acid groups.

7. A fluidising agent as claimed in claim 6 wherein the phthalocyanine contains on average from 1 to 1.5 sulphonic acid groups/mole.

8. A fluidising agent as claimed in claim 6 wherein not greater than 80% and not less than 20% of the acid groups are in the form of a diquaternary ammonium salt.

9. A fluidising agent as claimed in claim 1 wherein the coloured acid is a disazo dyestuff comprising a central divalent group which is free from acid and other ionic substituents which is linked through azo groups to first and second coupling components, the first coupling component is free from acid and other ionic substituents and the second coupling component carries one or more acid groups and is free from other ionic substituents.

10. A fluidising agent as claimed in claim 9 wherein the central divalent group is a biphenylene group which may be unsubstituted or substituted by one or more non-ionic groups.

11. A fluidising agent as claimed in claim 10 wherein the non-ionic group is $C_{1-6}$-alkyl, $C_{1-6}$-alkoxy, halogen, nitrogen or cyano.

12. A fluidising agent as claimed in claim 9 wherein the first coupling component is a pyrazolin-5-on-yl group, a 2-hydroxy-naphth-1-yl group or an acetoacet-2-ylanilide group which may be substituted by $C_{1-6}$-alkyl, $C_{1-6}$-alkoxy, halogen, nitro, cyano, $C_{1-6}$-alkoxycarbonyl, phenylaminocarbonyl, naphthylaminocarbonyl and phenyl in which the phenyl and naphthyl groups may also be substituted by $C_{1-6}$-alkyl, $C_{1-6}$-alkoxy, nitro, halogen or cyano.

13. A fluidising agent as claimed in claim 9 wherein the second coupling component contains one or more acid groups but is otherwise identical to the first coupling component.

14. A fluidising agent as claimed in claim 1 wherein the coloured acid is a disazo dyestuff comprising a central divalent group which contains one or more acid groups and where the acid groups are in the form of a salt of a diquaternary ammonium cation.

15. A composition comprising an organic liquid and a fluidising agent as claimed in claim 1.

16. A composition comprising a pigment and a fluidising agent as claimed in claim 1.

17. A composition as claimed in claim 16 wherein the pigment is a phthalocyanine or disazo pigment.

18. A dispersion comprising a pigment, organic liquid, dispersant and a fluidising agent as claimed in claim 1.

19. A dispersion as claimed in claim 18 wherein the dispersant is obtained by reacting polyester chains with amines, polyamines or polyimines to form amide and/or salt linkages.

20. A dispersion as claimed in claim 19 wherein the polyester chain is derived from a hydroxycarboxylic acid containing from 6 to 20 carbon atoms between the hydroxy and carboxylic acid groups.

21. A dispersion as claimed in claim 18 wherein the organic liquid is substantially non-polar.

22. A millbase comprising a pigment, organic liquid, dispersant, film-forming resin and a fluidising agent as claimed in claim 1.

23. A paint or printing ink comprising a pigment, dispersant, film-forming resin and a fluidising agent as claimed in claim 1.

* * * * *